Patented Oct. 8, 1929

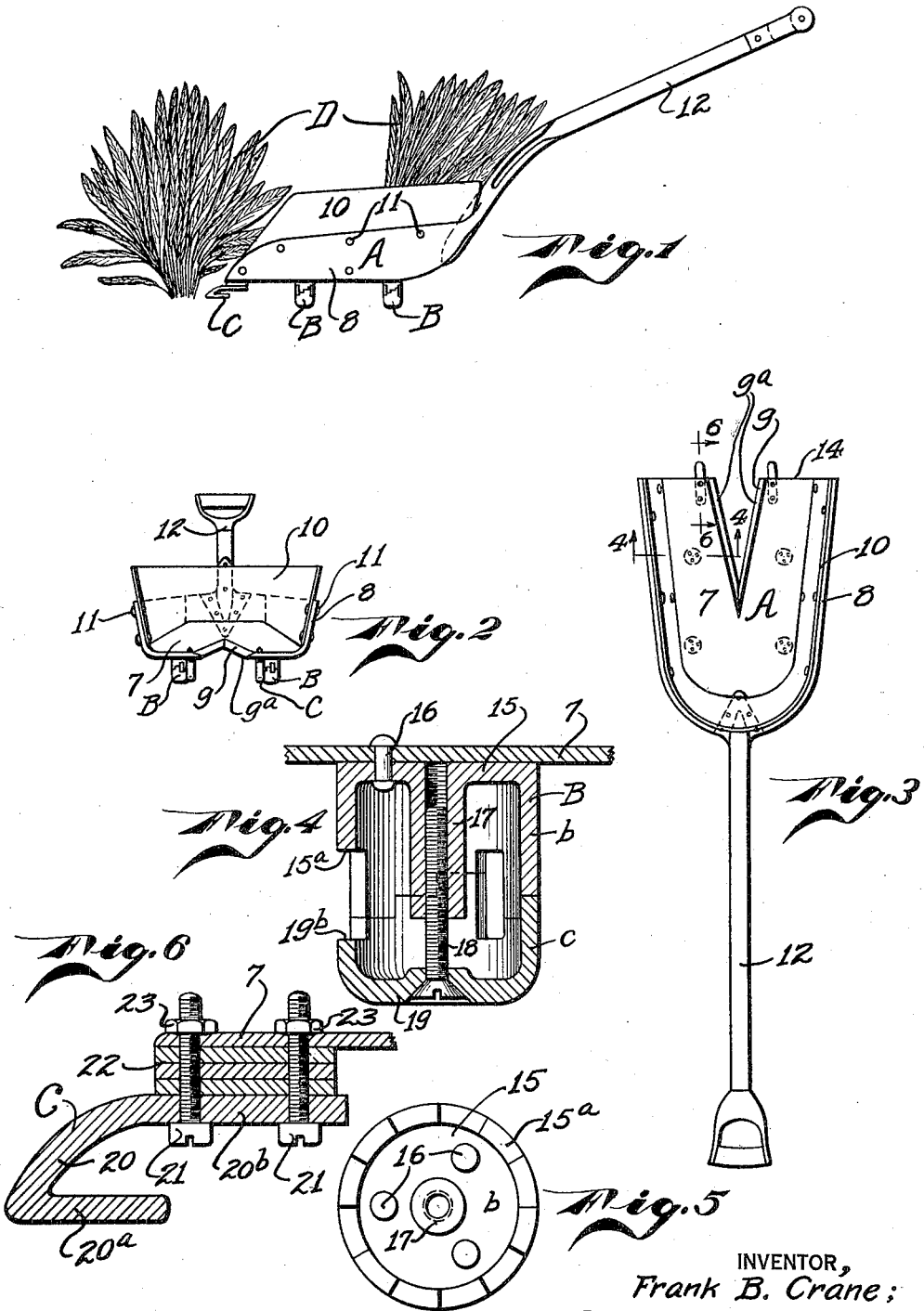

1,730,759

UNITED STATES PATENT OFFICE

FRANK B. CRANE, OF LOS ANGELES, CALIFORNIA, ASSIGNOR TO CALIFORNIA SANITARY CANNING CO., A COPARTNERSHIP CONSISTING OF JOSEPH SHAPIRO AND GEORGE SHAPIRO, OF LOS ANGELES, CALIFORNIA

AGRICULTURAL IMPLEMENT

Application filed October 27, 1924. Serial No. 745,966.

This invention relates to agricultural implements and more particularly to implements for harvesting the tops or upper growths of vegetables such as spinach. In using the device for harvesting leaves of spinach or other plants, the same is adapted to be passed over the surface of the ground and is capable of proper adjustment to cause the forward cutting portion of the implement to sever the leaves from the tap root and deposit them separate upon or within the implement. After the implement has been filled with the cut leaves the same are removed and transported to the packing house where they are suitably processed and packed. The invention has for an object the provision of an improved novel implement of the general character stated which will be adaptable to a wide range of uses for various purposes and which will be relatively inexpensive and simple in construction, combined with positiveness and convenience in use and action, and which will be generally superior in efficiency and serviceability.

With the above and other objects in view, the invention consists in the novel and useful formation, construction, combination, association and relative arrangement and mode of use and operation of parts, elements and features, and the device as an entirety, all as hereinafter described, shown in the drawing and finally pointed out in claims.

In the drawing:

Figure 1 is a perspective view of an implement constructed and organized in accordance with the invention and illustrated in position for use and service, certain spinach leaves to be harvested being shown in the figure;

Figure 2 is a front end view of the implement shown in Figure 1;

Figure 3 is a top plan view of said implement;

Figure 4 is a detail transverse sectional view taken on the line 4—4, Figure 3;

Figure 5 is a detail bottom plan or face view of the upper portion of the means or member shown in Figure 4; and, Figure 6 is a detail sectional view taken upon the line 6—6, Figure 3;

Figures 4, 5 and 6 are upon an enlarged scale.

Corresponding parts in all the figures are designated by the same reference characters.

Referring with particularity to the drawing, I have shown at A the main or body portion of an agricultural implement constructed and organized to embody the invention in one form. The same consists in the main of a bottom or plate member 7 having upwardly turned walls 8 at the sides and rear portion thereof, and formed with a longitudinal V-shaped notch 9, the edge portions 9ª of which are sharpened to constitute cutting edges converging rearwardly. Set within the side and rear walls 8 is an upstanding member 10 bolted to said wall portions 8 as at 11, and said walls 8 and 10 conjointly constitute a receptacle for collecting the recovered spinach leaves or the like, the base or plate 7 and said walls 8 and 10 jointly constituting in general contour and shape a deep shovel with the cutting notch 9 in the forward portion. A handle member 12 is riveted onto the rear portion of the wall portions 10 and 8, and is used for directing the implement over the surface of the ground. To that end adjustable supports B and C are provided beneath the plate member A, the former being disposed in positions to constitute the primary supports for the main or shovel member A, and the latter being positioned beneath the front edge portion of the member A to determine the height thereof above the soil. The members C also serve as guides to direct the leaves into the cutting notch 9, such members projecting slightly forward of the preferably straight front edge 14 of the plate portion 7.

Each of the supports B comprises an upper annular member $b$ and a lower annular member $c$, the upper annular member having a head 15 which is riveted as at 16 to the plate portion 7 of the member A. Such member $b$ also has a central elongated internally threaded tubular hub portion 17 depending from the head 15, and within which fits the shank of a screw 18, the head of which is set into the lower annular member $c$ or the head 19 thereof. The lower edge portion $15^a$ of the upper annular member $b$ and the upper edge portion or periphery $19^b$ of the lower annular member $c$ are complementarily stepped or shouldered for inter-engagement, in varying relations, as permitted and accommodated by the play of the screw 18 within the hub 17, to positively relatively position the members $b$ and $c$ so as to more or less increase or decrease the total vertical dimension of such members $b$ and $c$, more or less of the shoulders or steps being in inter-engagement in accordance with the degree of extension of such members. This permits the member A to be elevated to the proper extent with said members B resting upon the soil, to bring such member A into proper position to engage, cut and recover the spinach or other plant leaves, as shown in Figure 1. The members C comprise angular shoes 20 having base portions $20^a$ to rest upon or traverse the soil and parallel spaced crowns $20^b$ which are suitably connected with the plate 7 of the shovel member as by bolts 21 passing through such crown member in each instance and through perforated spacers or washers 22 interposed between such crown and the plate 7, nuts 23 being applied to hold the various parts in assemblage. By adding or subtracting spacers 22 the height at which the forward edge 14 of the plate 7 is disposed above the soil, so as to cause proper engagement of the implement with the leaves to be harvested, may be determined. These members $c$ are at either side of the cutting notch 9, and guide the leaves thereinto.

In the operation and use of the invention the member A is caused to traverse the soil from plant to plant to be havested, being manipulated by the handle member 12. As the implement approaches a spinach plant or other vegetable growth the leaves of which are to be harvested, the shoes 20 direct such grouped or bundled leaves into the cutting notch 9, the implement being properly spaced from the ground by the adjustable supporting members B. Further advance of the implement causes the severance of the leaves D which fall into the shovel member and are removed therefrom for transference to the packing house. The implement provides an efficient and speedily and accurately and conveniently operated device for recovering and harvesting spinach and other plant leaves, and it may be effectively and conveniently adjusted to meet various conditions to be dealt with.

It is obvious that various changes and modifications and substitutions may be made with respect to the disclosure of the drawing and foregoing description, in adapting the invention to varying conditions of use and service, without departing from the true spirit of the invention.

Having thus disclosed my invention, I claim and desire to secure by Letters Patent:

1. An implement of the character disclosed, comprising a member adapted to be presented to vegetable growth and provided with a continuous stationary cutting portion to sever the growth whereby it may be received by the implement; and guide means secured to said members and extending beyond the cutting portion for directing the growth to the cutting portion of the implement.

2. An implement of the character disclosed, comprising a member adapted to sever and receive vegetable growth, a handle for manually controlling movement thereof, and means for varying the height of said member above the soil.

3. An implement of the character disclosed, comprising a member adapted to sever and receive vegetable growth, a handle for manually controlling movement thereof, a guide for directing the growth to said member, and means for supporting the member at different heights above the soil.

4. In an implement of the character disclosed, a member adapted to be presented to vegetable growth to cut and receive same, and means for varying the height of the implement above the soil; said means comprising relatively adjustable members having co-engaging portions which vary the height of said means when in different co-engaging relations.

5. In an implement of the character disclosed, a member adapted to be presented to vegetable growth to cut and receive the same, and means for varying the height of the implement above the soil; said means comprising relatively adjustable members having co-engaging portions which vary the height of said means when in different co-engaging relations; said members comprising relatively rotatable portions having complementarily stepped faces.

6. In an implement of the character disclosed, a member adapted to be presented to vegetable growth to cut and receive same, and means for varying the height of the implement above the soil; said means comprising relatively adjustable members having co-engaging portions which vary the height of said means when in different co-engaging relations; said members comprising relatively rotatable portions having complementarily stepped faces; and means being provided for connecting said members and maintaining the same in relatively adjusted relations.

7. An implement of the character disclosed, having a shovel member provided with a guide for directing growth thereto, means for connecting said guide with such shovel member, and spacers whereby said guide may be so connected in varying spaced relations.

In testimony whereof, I have signed my name to this specification.

FRANK B. CRANE.